(12) United States Patent  
Pfenninger et al.

(10) Patent No.: US 6,996,367 B2  
(45) Date of Patent: *Feb. 7, 2006

(54) TEST ADMINISTRATION SYSTEM USING THE INTERNET

(75) Inventors: David T. Pfenninger, Carmel, IN (US); Chris J. Hester, Cypress, TX (US)

(73) Assignee: Performance Assment Network, Indianapolis, IN (US)

( * ) Notice: Subject to any disclaimer, the term of this patent is extended or adjusted under 35 U.S.C. 154(b) by 34 days.

This patent is subject to a terminal disclaimer.

(21) Appl. No.: 10/757,223

(22) Filed: Jan. 14, 2004

(65) Prior Publication Data

US 2004/0146845 A1 Jul. 29, 2004

Related U.S. Application Data

(63) Continuation of application No. 09/757,989, filed on Jan. 10, 2001, now Pat. No. 6,681,098.

(60) Provisional application No. 60/175,529, filed on Jan. 11, 2000.

(51) Int. Cl.
*G09B 7/00* (2006.01)

(52) U.S. Cl. .................. 434/362; 434/350; 434/336

(58) Field of Classification Search ................ 434/362, 434/350, 336
See application file for complete search history.

(56) References Cited

U.S. PATENT DOCUMENTS

| | | | |
|---|---|---|---|
| 4,486,180 A | 12/1984 | Riley | |
| 4,764,120 A | 8/1988 | Griffin et al. | |
| 5,170,362 A | 12/1992 | Greenburg et al. | |
| 5,513,994 A | 5/1996 | Kershaw et al. | |
| 5,590,057 A | * 12/1996 | Fletcher et al. | ............ 702/182 |
| 5,601,432 A | 2/1997 | Bergman | |
| 5,601,436 A | 2/1997 | Sudman et al. | |
| 5,710,887 A | 1/1998 | Chelliah et al. | |
| 5,823,781 A | 10/1998 | Hitchcock et al. | |
| 5,827,070 A | 10/1998 | Kershaw et al. | |
| 5,889,863 A | 3/1999 | Weber | |
| 5,893,098 A | 4/1999 | Peters et al. | |
| 5,915,973 A | 6/1999 | Hoehn-Saric et al. | |
| 5,947,747 A | 9/1999 | Walker et al. | |

(Continued)

OTHER PUBLICATIONS

Testing & Assessments. Informational Sheet (online). National Computer Systems, Inc., 1998 [retreived on Jan. 6, 2000]. Retrieved from the Internet: <URL: www.ncs.com/ncscorp/aoe/testing.

(Continued)

*Primary Examiner*—Chanda L. Harris
(74) *Attorney, Agent, or Firm*—Maginot, Moore & Beck

(57) ABSTRACT

A test administration system comprises a central computer and associated database containing a plurality of tests that may be distributed to a test taker. The central computer provides a website to be accessed by the test administrator and the test taker at remote personal computers when using the test administration system. The website includes an administrator workspace for use by the test administrator and a testing workspace for use by the test taker. The administrator workspace provides the test administrator with the ability to order any number of the tests contained in the database. After ordering a number of tests, the test administrator uses the system to generate test identification codes for a chosen set of ordered tests. The system automatically provides the test identification codes to those test subjects taking a test, and provides the test subject with access information and instructions for using the system to take the test. The test administrator workspace also provides the test administrator with valuable test status information concerning the tests ordered by the administrator.

20 Claims, 12 Drawing Sheets

U.S. PATENT DOCUMENTS

| | | | |
|---|---|---|---|
| 6,018,617 | A | 1/2000 | Sweitzer et al. |
| 6,039,575 | A | 3/2000 | L'Allier et al. |
| 6,064,856 | A | 5/2000 | Lee et al. |
| 6,112,049 | A * | 8/2000 | Sonnenfeld ............... 434/350 |
| 6,347,333 | B2 | 2/2002 | Eisendrath et al. |
| 6,681,098 | B2 * | 1/2004 | Pfenninger et al. ......... 434/362 |
| 2002/0028430 | A1 | 3/2002 | Driscoll et al. |

OTHER PUBLICATIONS

Vue, Informational Sheet [online]. National Computer Systems, Inc., 1999 [retrieved on Jan. 6, 2000]. Retrieved from the internet: ,URL: www.ncs.com/ncscorp/aoe/testing.htm>.

NetAssess. Informational Sheet [online]. Institute for Personality and Ability Testing, Inc., 1999 [retrieved on Jan. 6, 2000]. Retrieved from the Internet: <URL: www.ipat.com/monthlynews.html>.

NetAssess Resources. Informational Sheet [online]. Institute for Personality and Ability Testing, Inc., 1999 [retrieved on Jan. 6, 2000]. Retrieved from the Internet: <URL: www.ipat.com/NetAssess.html>.

Products & Services. Informational Sheet [online]. Institute for Personality and Ability Testing, Inc., 1999 [retrieved ob Jan. 6, 2000]. Retrieved from the Internet: <URL: www.ipat.com/scoressys.html>.

NetAssess Software. Information Sheet [online]. Institute for Personality and Ability Testing, Inc., 1999 [retrieved on Jan. 6, 2000]. Retrieved from the Internet: <URL: www.ipat.com/NetAssess/scripts.html>.

Mead, Alan, NetAssess & Trade: User's Manual [online]. VO.20, Oct. 4, 1999. Retrieved from the Internet: <URL: www.ipat.com/NetAssess/index.html>.

* cited by examiner

Tester ID Information

Tester ID: T9384177

Test: Career Automotive Retailing Survey (CARS)   Date Assigned: 10/30/2000 10:10:49 AM You may update the assignment information by making your changes and clicking Submit. Check Notify if you wish to send an automatic email notification.

Email Notification

> pan will generate and send the following email message, automatically providing the following information: Tester Name (@TesterName), Tester ID (@TesterID), Test Name (@TestName), and Administrator Name, Phone Number, and Email Address (@AdminName, @AdminPhone, and @AdminEmail).

You may make changes to the email message below.

```
Or go to http://www..pantesting.com and click 'Testing.' Then inter the
following information:

Tester ID: @ Tester ID
Adminstrator ID: A4478740

Follow the directons on the screen. If you have any question, contact
me.

@ AdminName
@ AdminPhone
@ AdminEmail
```
— 139

To allow someone to take a test from this computer without leaving your pan Box, click the ▤ icon and the test session will be launched in a new browser window. Note: You must save any changes you make below by clicking Submit *before* clicking the icon to take the test.

| Notify | Tester ID | First Name | MI | Last Name | Email Address |
|---|---|---|---|---|---|
| ☐ | T9384177 | Christa | P | Isaacs | crista@pan |

138  132           134              134                                136    40

130

[Submit]

FIG. 12

TEST ADMINISTRATION SYSTEM USING THE INTERNET

CROSS REFERENCE TO RELATED APPLICATIONS

This application is a continuation of U.S. application Ser. No. 09/757,989, filed Jan. 10, 2001, which issued into U.S. Pat. No. 6,681,098 on Jan. 20, 2004, which claims the benefit of U.S. Provisional Application No. 60/175,529, filed Jan. 11, 2000.

BACKGROUND OF THE INVENTION

The present invention relates to the field of administering tests, and more particularly to the field of administering tests over the Internet.

Standardized testing assessments have traditionally been administered using a test booklet where the test subject either reads from the test booklet, or listens to another read from the test booklet, and responds to each of the questions on an answer sheet using a pen or pencil, or on an individual personal computer using locally housed software program. These types of tests have generally required that the test taker be physically present at the same location as the individual administering the test, or if administered remotely, required the test booklet be delivered from the test administrator by some means such as courier or mail. Once the test was completed, the test taker was required to deliver the test answer sheet to the administrator by some delivery means such as courier or mail. Remote testing was not possible using the local software/personal computer model, which requires that testing be administered via a specific computer.

These methods of test taking from a remote location produced a number of problems. First, the process of exchanging test booklets and answer sheets was time consuming, expensive and inconvenient for both test administrators and test takers. Test takers were often required to wait some time before the test booklet was delivered to them, and test administrators were often required to wait some time before receiving the answer sheet from the test taker. Furthermore, test administrators responsible for keeping test records and grading tests were required to have physical access to answer sheets in order to score the tests and compile records about the tests. Thus, if the test administrator was away on a business trip, for example, he was prevented from viewing test results and compiling information on the tests until he returned to his office.

It would therefore be advantageous to provide a testing system wherein the test taker may take a test while being removed from the test administrator without having to await receipt of a test booklet before beginning the test. It would be of further advantage if the test taker could quickly and conveniently provide his answer data sheet to the test administrator for scoring and processing. It would also be advantageous if the test administrator were able to enjoy completely electronically prepared reports, review test results from any number of remote locations, and check on the status of tests being given from various remote locations. Finally, it would be advantageous for the test administrator to be able to order from an array of tests using convenient electronic commerce methodologies.

SUMMARY

The present invention is directed to a test administration system that allows a test subject (i.e., a test taker) to remotely take a test using a personal computer connected to the Internet. The test administration system also allows a test administrator to review test results and other test information from a personal computer connected to the Internet. The test administration system comprises a central computer and associated database containing a plurality of tests that may be distributed to the test taker. The central computer provides a website to be accessed by the test administrator and the test taker at remote personal computers when using the test administration system. The website includes an administrator workspace for use by the test administrator and a testing workspace for use by the test taker.

The administrator workspace is accessible by test administrators registered to use the system after receiving an administrator identification code and password. The administrator workspace provides each test administrator with the ability to order any number of the tests contained in the database. When ordering test, a list of tests is presented to the test administrator, and the test administrator simply a number of desired tests for distribution to his test subjects. After selecting all of the desired tests, the administrator checks out by confirming the order and arranging payment for the tests. After ordering a number of tests, the test administrator uses the system to generate test identification codes for a chosen set of ordered tests. The administrator then associates each test from the chosen set of ordered tests with one of the administrator's test subjects. The system automatically sends an e-mail message to those test subjects associated with a test, and provides the test subject with access information and instructions for using the system to take the test.

The test administrator workspace also provides the test administrator with valuable test status information concerning the tests ordered by the administrator. For example, using the test administration workspace, the test administrator can obtain information about the total number of tests ordered by the test administrator and the total number of tests that have been completed by various test subjects. In addition, the test administration workspace can provide the test administrator with information about tests currently in progress, the number of tests assigned to various test subjects, and the number of tests that were not completed by test subjects before an allotted time deadline and have therefore expired.

The testing workspace is accessed by the test taker after receiving access information, including a test identification code, from the test administrator. Using the test identification code, the test taker is provided with access to the testing workspace. The testing workspace delivers the designated test to the test taker and the test taker answers the test questions using the remote computer. Once the test taker has finished taking the test, the test answers are delivered to the database. A test scoring machine obtains the test answers from the database, scores the test, and provides a test report for the test taken by the test taker. The test administrator may view the test report within the administrator workspace.

The test administration system thus provides a testing system wherein a test administrator may order tests from a remote computer and deliver the tests to test subjects located at other remote computers. The test takers may take tests on the remote computer without needing the administrator's presence. In addition, after each test subject completes his or her test, the test taker's answers are quickly and conveniently provided to the system and scored so they may be viewed by the administrator at a remote location. The system also provides the test administrator with a wide variety of information, including information about completed tests, expired tests, and tests currently in progress. These an other features, aspects, and advantages of the present invention will become better understood with reference to the following description and appended claims.

BRIEF DESCRIPTION OF THE DRAWINGS

FIG. 12 shows a Tester ID information page for the test administration system using the Internet.

DETAILED DESCRIPTION

System Architecture and Process

Figure 1:
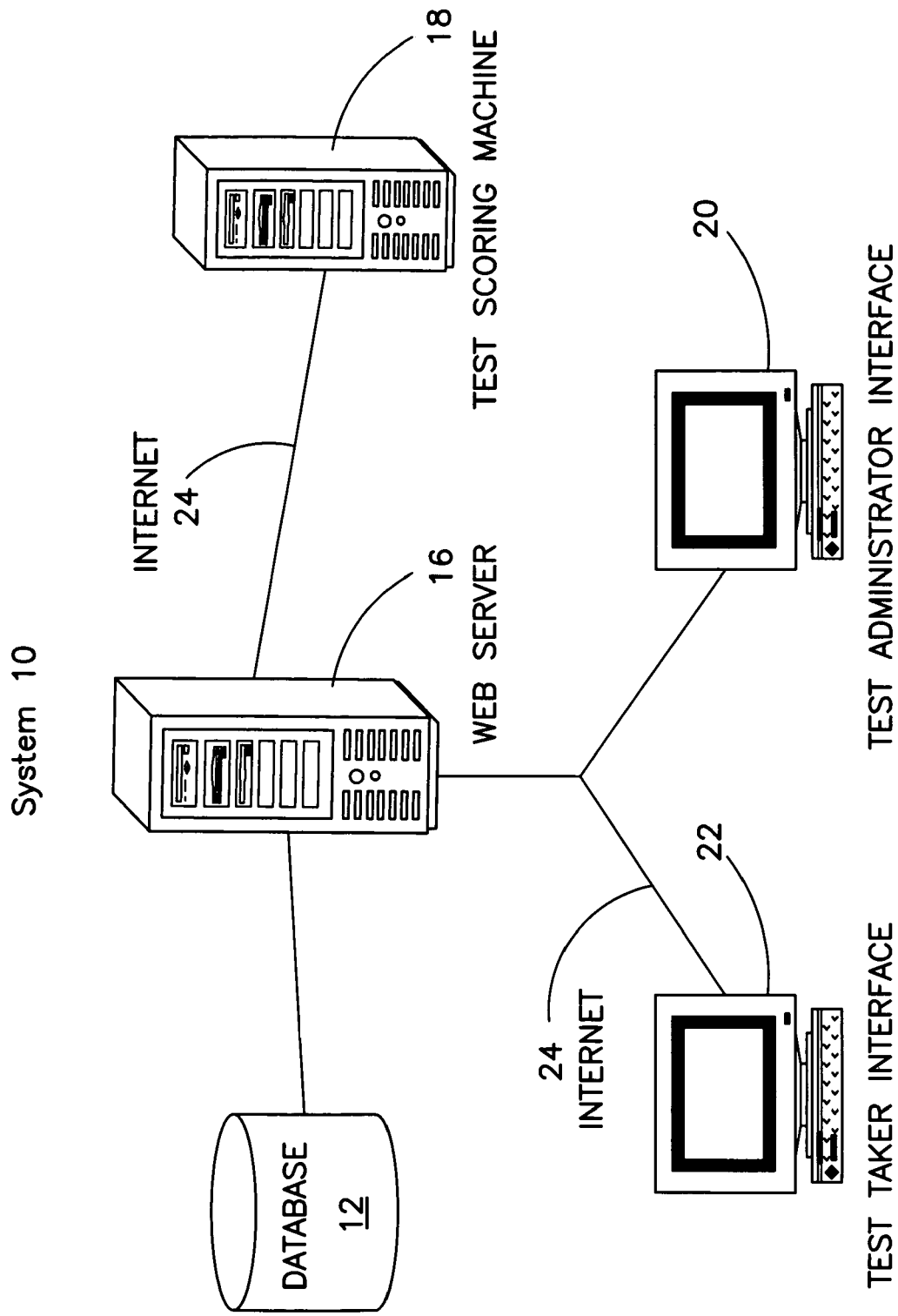
FIG. 1 is a block diagram of the flow of data in a test administration system using the Internet.

The present invention is a system for administering tests via the Internet. Referring to FIG. 1, there is shown a block diagram of the system 10, showing the flow of data amongst various system components. The test administration system 10 includes a database 12 and a central computer in the form of a web server 16, both residing with an Internet Service Provider (ISP). The web server 16 is connected via a network such as the Internet 24 to a test scoring machine 18, typically residing at a location removed from the web server. The test scoring machine 18 is operable to periodically access the ISP-based database 12, channel data into appropriate scoring algorithms for given tests, generate actuarial reports based on scored responses, re-connect to the ISP-based database, and deliver finished test reports to the ISP-based database for consumption by the test administrator.

The web server 16 may be connected to any number of remote computers or other Internet devices using the Internet 24. The web server 16, in conjunction with the database 12, provides an Internet website that may be accessed by the remote computers or other Internet devices using an Internet browser. One of the remote computers is a test administrator interface 20 used by test administrators to monitor the test taking activities of various test takers. Of course, the test administrator interface 20 is not limited to a single computer, but may be any number of computers providing access to the Internet.

The test administrator is the individual who has registered to use the system 10 and who has test subjects take tests using the system. For example, the test administrator may be a psychiatrist having a certain patient take a particular psychological test, or a human resource director administering pre-employment screening tests. Other examples of test administrators include, but are not limited to, educators, employers, psychologists, vocational specialists, and physicians. Examples of test subjects include, but are not limited to, students, employees, and patients. The test administrator is also referred to herein as the "administrator," and the test subjects are also referred to herein as "subjects" or "test takers."

The term "tests," as used herein, is meant to encompass traditional tests of knowledge, skill, or content, as well as various assessments, surveys, and other measurement tools and queries generally conforming to the format of standard stimuli (often questions or statements) presented to a subject who then provides a response to a circumscribed set of response options. The tests provided using the system are typically tests that have been traditionally taken using a test booklet where the test subject either reads from the test booklet, or listens to another read from the test booklet, and responds to each of the questions either verbally or using a pen or pencil, or those used in local PC/software approaches. However, the present invention allows the test subject to take such tests, as administered by the test administrator, using a computer or Internet device connected to the Internet. The computers or Internet devices used by test subjects to take tests are represented in FIG. 1 by the test taker interface 22. Of course, the test taker interface 22 is not limited to a single computer or device access point, but may in fact be accessed via any number of computers connected to the Internet at various locations.

Figure 2:
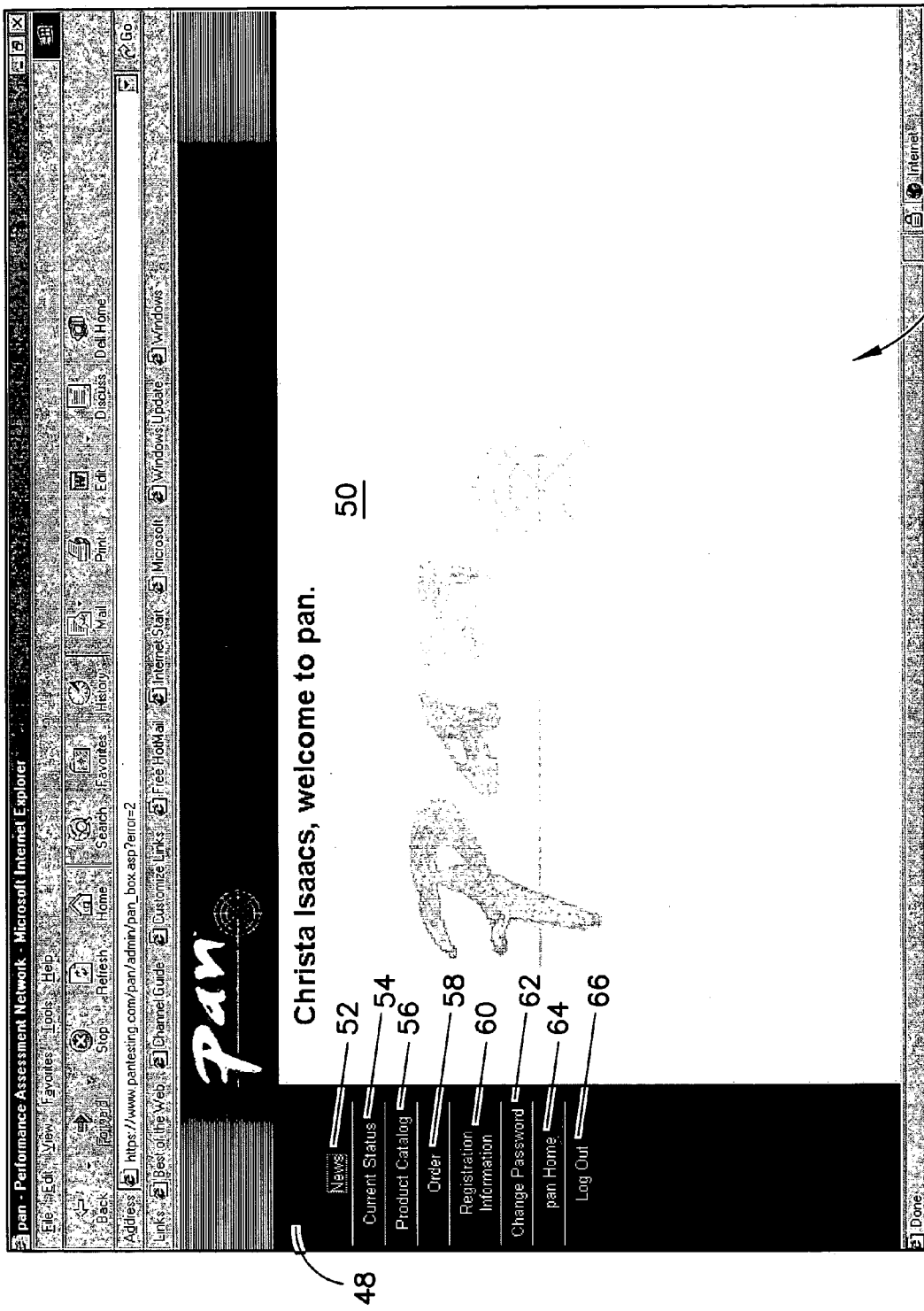
FIG. 2 shows an administrator page for the test administration system using the Internet.

The web server 16 and its related database 12 provide a website on the Internet where both administrators and subjects may visit. The web server 16 is operable to serve up various web pages that allow interaction between the administrator and the system 10 or the subject and the system 10. Certain pages of the website may only be accessed by individuals having the proper credentials, such as a proper identification number and password. For example, a test administrator page 50, similar to that shown in FIG. 2, is created for each test administrator using the system. The test administrator must have a valid Administrator ID and password to reach the test administrator page. The test administrator page is a personalized web page for the administrator providing the administrator with options for conducting a number of activities, including ordering tests and viewing test scores for various test subjects. A more detailed discussion of the test administrator's page is described below under the heading "Test Administrator Workspace." The general public is prohibited from viewing the test administrator page 50, but the public may access other pages of the website, such as the website home page, without the need for any special credentials.

Referring again to FIG. 1, the database contains various tests that the system is capable of providing to test subjects, as well as, other important information, such as test administrator registration data. It also serves as the source of the dynamic-page generated test administrator workspace pages, where completed tests are viewed and other test administrator functions, such as ordering and monitoring tests, are conducted. These functions are described in greater detail below. The tests themselves are provided to the system under distribution contract by any number of different test providers and publishers.

Tests may only be ordered by administrators registered to use the system 10. During the registration process, each administrator is assigned a unique Administrator ID code which identifies that particular administrator. The administrator also chooses a password. The registration process also involves obtaining the test administrator's qualifications. These test administrator qualifications are used to clear the administrator to order certain tests and types of tests. For example, an administrator may need to show that he holds a doctoral degree in psychology, or a related discipline, before he is provided the clearance to order certain "license-controlled" tests carried by the system; such as tests for clinical pathology. After receiving an Administrator ID, selecting a password, and receiving a clearance level, the administrator may order tests through the system using the administrator page 50. The process for ordering tests using the administrator page 50 is explained in more detail below under the heading "Test Administrator Page."

After ordering a test, the administrator obtains a unique, random-number generated test identification code (i.e., "Tester ID") for each ordered test. These Tester ID codes are then delivered to the test administrator's test subjects by electronic mail along with his Administrator ID code. This pairing links the particular test to the test administrator within the system. These codes are then used by the test subjects to access particular tests provided by the system 10. The process of obtaining such Tester ID codes and delivering them to test subjects is explained in more detail below under the heading "Test Administrator Page."

In order to access a particular test ordered by the test administrator, the test subject connects to the Internet using the test taker interface 22 either by clicking the link embedded in the electronic mail message sent by the system or entering the system's uniform resource locator (URL) in the browser. If the test subject clicks on the link embedded in the electronic mail message, the test subject is sent directly to a page which delivers the test to the test subject. If the test subject enters the system's URL, the browser on the test taker interface 22 will pull up the system home page and the test subject may indicate that he wishes to take a test using the system by simply selecting a "Testing" button on the web site home page. This advances the test taker to a test access page. Before the test subject is cleared for testing, he must enter a valid Administrator ID and Tester ID combination in the test access page. Failure to enter the proper combination precludes access, and the subject is prompted to contact the test administrator for assistance. Once the test subject inputs a valid Administrator ID and Tester ID, the web server clears the test subject to take the test and provides a testing workspace to the test subject. The testing workspace includes the pages of website where the test associated with the entered Tester ID is delivered to the test subject. The process of providing access to the test taker workspace may be completed by the test taker, or, in some occasions, it may be completed for him by the test administrator in the event of "proctored" testing situations.

The testing workspace delivers the test to the test subject by providing a series of web pages having one or more questions or items with corresponding response options which the test subject responds to by pointing and clicking the mouse to demarcate his desired response. The subject may scroll up the page to review responses. Upon completion of the test, the web server 16 stores the test subject's raw answers in the database 12. After answering the final question of the test, the test subject indicates that the test is complete by clicking a "submit" button. If any questions were unanswered, the subject is prompted to complete each question, provided that a response to the question is mandatory. Upon successful completion of the test and submission of test answers, the system prevents the test subject from performing any further work on the test.

If a test subject is prevented from completing the test in one sitting, such as when power to the web server or test taker interface is interrupted during testing, the test subject may log on at a later time with the original Test Administrator ID and Tester ID and complete the test. However, test subjects are only allotted a limited amount of time to complete a test. For example, a test subject may only be given 24 hours to complete a test from the time that the test subject originally entered the valid Administrator ID and Tester ID. If a test subject begins a test, but is unable to complete the test within the prescribed period of time, the test subject's Tester ID will expire, and the test subject will be prevented from taking the test using the expired Tester ID. In this situation the test subject is required to obtain a new Tester ID from the administrator and take the test again using the new Tester ID.

Test Scoring Machine

After completing a test, the subject's raw answers are stored in the web server database 12. Before these raw answers are scored, they must be transferred to the test scoring machine 18. The web server 16 is connected to the test scoring machine 18 by an Internet connection. The test scoring machine includes Windows® based scoring software designed to run on a Windows NT® server. The scoring software houses test scoring algorithms, as provided by the various test publishers for their respective tests, ensconced in specially programmed "modules." The test scoring programs are operable to score the raw answers stored in the database. The scoring machine software is launched on a regular schedule, causing the test scoring machine to connect to the web server via the Internet. When connecting to the server, the test scoring machine 18 uses open database connectivity (ODBC) parameters stored in a registry of the test scoring machine to assist the test scoring machine in accessing data from the web server database 12.

Once connected to the web server 16, the test scoring machine 18 downloads data from the database 12 containing records for each completed but un-scored set of test answers residing in the database. Each of the retrieved records contains information on the test taker, the test administrator, and the type of test taken and scoring program required to score the test. Next, the test scoring machine runs a program to retrieve the raw answers in each record and runs the appropriate test scoring program for each set of raw answers. All test scoring programs are stored in the test scoring machine 18. Execution of a test scoring program results in a test report for each set of raw answers.

After scoring the raw answers offline, an error-checking program is run by the test scoring machine 18. If no errors occurred during scoring of the tests, the records containing the test answers are marked as "scored," connection to the web server is re-established, and the test reports are returned to the database. All data used in the creation of the test reports, including test taker information, raw answers, and calculated scores is saved in an XML file. These files are permanently stored on the test scoring machine 18. Test reports are provided in Adobe Acrobat® PDF format. The test scoring machine 18 delivers the test reports to the web server 16 using the Internet connection. Once the test reports are stored on the web server, the test scoring machine disconnects from the Internet. The security procedures utilized by the system insure that test reports saved to the database may only be viewed by the registered administrator who ordered the particular tests associated with the test reports.

The test scoring machine is configured to periodically connect and disconnect from the web server. For example, the test scoring machine may be configured to connect to the web server once every quarter hour, and score all tests that have been completed and stored in the database since the last session. The test scoring machine may be configured to make a record of its actions each time it connects to the web server. The records kept for any one connection period are known as "log sessions." A system operator configures the test scoring machine to determine the amount of information to be recorded in any given log session. The system may be configured to log "no information," "low information," or "high information." Under a low information log, the system records the start and stop time of the log session, any unexpected results or errors that occur during the log session, all SQL return codes, and notes the completion of various steps performed by the test scoring machine as described in the preceding paragraph. Under a high information log, the system records everything that was logged under low information plus all ODBC parameters, all input parameters and all output values from the procedures described in the preceding paragraph.

After raw test answers are scored by the test scoring machine and test reports are stored on the web server 16, the test scoring machine sends an electronic mail message to the test administrator. This message tells the administrator that particular tests ordered by the administrator have been completed by particular subjects, and test reports are available for viewing on the system website.

Test Administrator Workspace

Use of the system by the test administrator will now be explained with particular reference to a test administrator workspace which is accessible by the test administrator using the test administrator interface 20 when connected to the web server 16. To connect the test administer interface 20 to the web server 16, the test administrator connects his computer or device to the Internet and enters the system's uniform resource locator (URL) in the test administrator's browser. When the browser pulls up the website home page, the test administrator is presented with a number of choices, such as taking an on-line test, visiting the administrator workspace, and learning more about the owner of the website. The test administrator will typically visit the administrator workspace 40 by clicking the mouse on the designated button option which links the administrator to the test administrator workspace.

The test administrator workspace is now described with reference to FIGS. 2–12. The test administrator workspace 40 is an on-line workshop for the administrator providing him with the ability to order tests, obtain Tester IDs, track the status of ordered tests, and view secure test reports on-line with the ability to save or print the reports through the test administrator interface. The administrator workspace 40 may only be visited by registered administrators. As described previously, when registering with the system, the administrator will be assigned an Administrator ID and password, and will receive clearance to order certain types of tests. Before the administrator is provided access to the administrator workspace 40, he must enter his assigned Administrator ID and password.

As shown in FIG. 2, after successfully entering a valid Administrator ID and password, the administrator is provided access to the administrator page 50 which is the first page of the administrator workspace 40. The administrator page 50 offers the administrator a number of options. Some of the options offered on the administrator page include the following: a news option 52 which allows the administrator to view system news; a current status option 54 which allows the administrator to check the current status of the tests ordered by the administrator; a product catalog option 56 which allows the administrator to view the catalog of all tests; an order option 58 which allows the administrator to order additional tests for subjects; a registration information option 60 which allows the administrator to update his or her registration information; a password option 62 which allows the administrator to change his or her password 62; a home option 64 which returns the administrator to the website home page; and a log out option 66 which allows the administrator to log off of the website. A menu 48 showing each of these option is provided on the side of the test administrator page 50. When one of the options is selected from the menu 48, the administrator is presented with a sub-page within the administrator workspace which provides the administrator with tools to perform the indicated task. The menu is also provided on the side of each of these sub-pages, thereby allowing the administrator to move easily within the on-line workspace.

Figure 3:
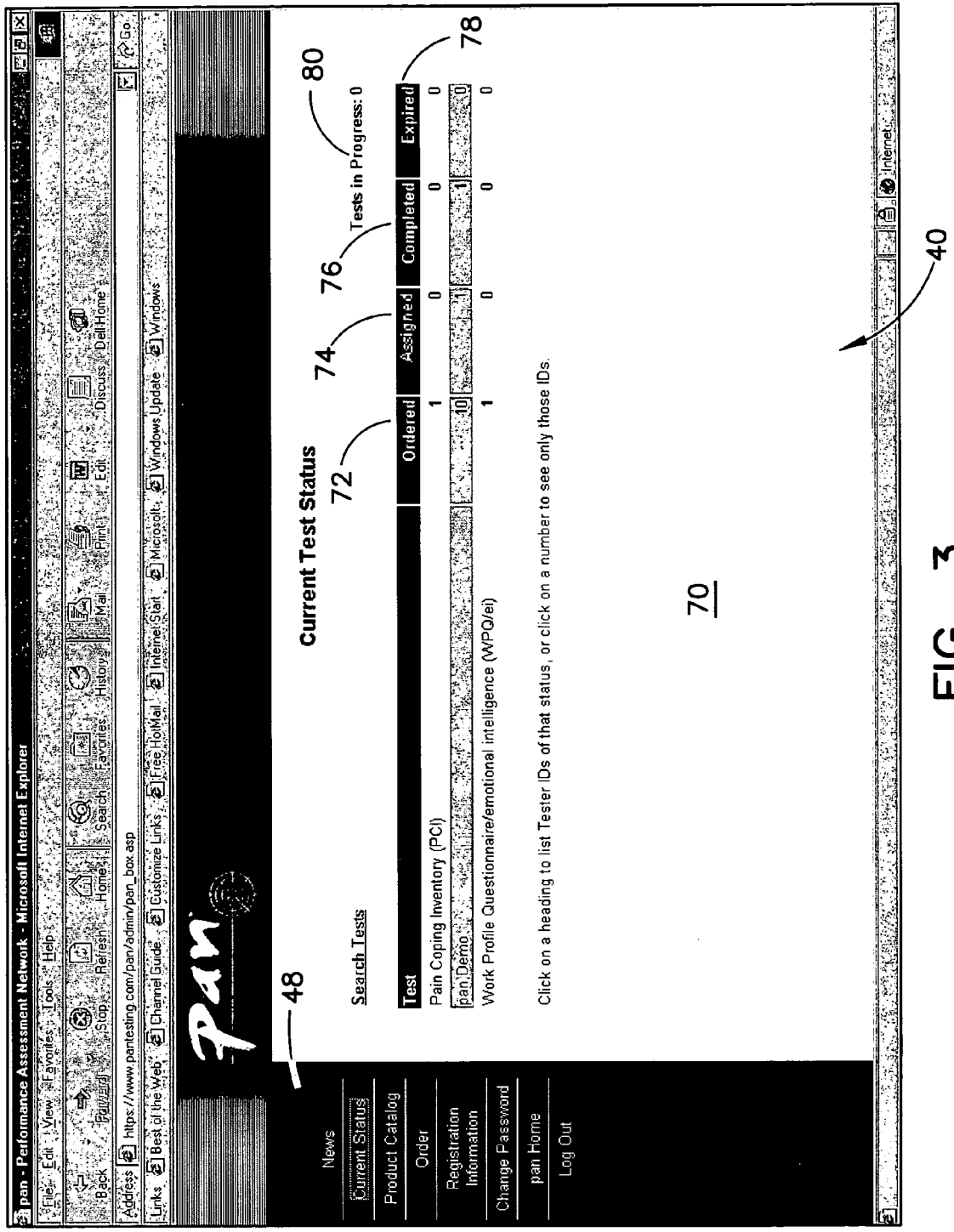
FIG. 3 shows a test status page for the test administration system using the Internet.

If the administrator chooses to view the current status of the administrator's tests by selecting the current status option 54, a test status page 70 is displayed. An exemplary test status page 70 showing the current status of an administrator's tests is shown in FIG. 3. The test status page 70 lists each type of test already ordered by the administrator along with information about each type of test ordered. Test status information provided under the test status page 70 includes the number of tests ordered in the "Ordered" column 72, the number of Tester IDs that have been generated and assigned to a test taker but have yet to be used in the "Assigned" column 74, the number of completed tests in the "Completed" column 76, and the number of tests that were started and not completed within the allotted timeframe in the "Expired" column 78. In addition, a "Tests in Progress" line 80 is provided on the test status page 70 to inform the administrator if any of the tests listed in the "Assigned" column 74 is currently in progress. By viewing the information provided on the test status page 70, the administrator can keep track of the tests already ordered by the administrator and determine whether additional tests will need-to be ordered to allow additional subjects to take or re-take particular tests. For example, referring to FIG. 3, if the administrator knows that at least five of his subjects still need to take the Pain Coping Inventory (PCI), and he has only ordered one PCI test, the administrator will know that he needs to order at least four more PCI tests before all five of his subjects can complete the test. On the other hand, if the administrator knows that at least five of his test subjects need to take the test labeled "pan Demo," there will be no need for the administrator to order additional "pan Demo" tests before distributing Tester IDs for these tests, since the administrator has already ordered ten of those tests.

Figure 4:
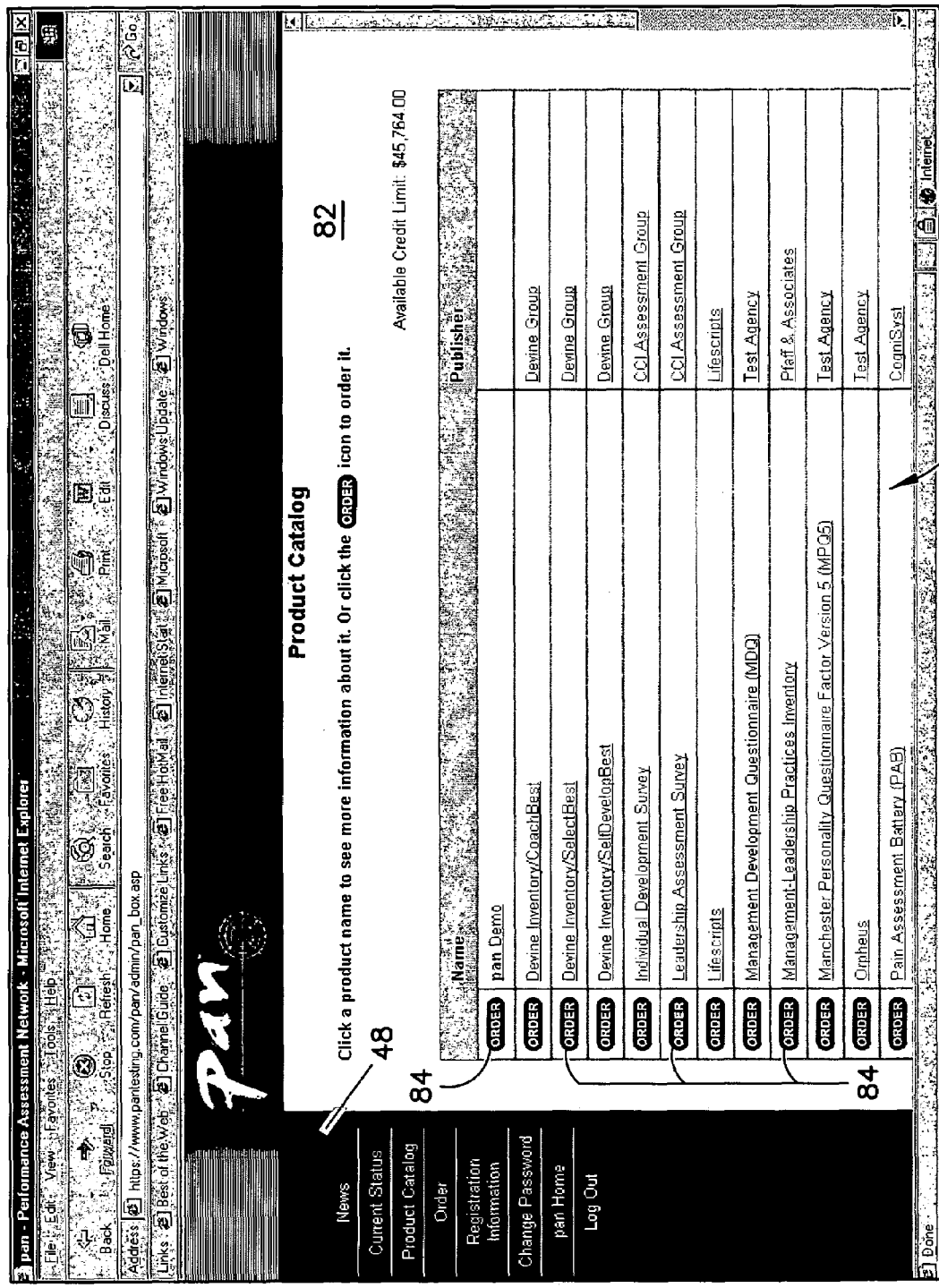
FIG. 4 shows a product catalog page for the test administration system using the Internet.

If the administrator decides that additional tests need to be ordered, he may do so by selecting the order option 58 from the menu 48. If the administrator does this, a product catalog page 82 is displayed. An exemplary product catalog page 82 is shown in FIG. 4. The product catalog page 82 shows the administrator a list of tests that may be ordered using the system and a link to each test's description along with a button to order the test. If the administrator wishes to find out additional information about a test, such as test subject matter or the price of the test, the administrator simply clicks on the test name, and the administrator is provided with information about the test. The administrator's available credit line 86 is also provided on the product catalog page 82 so the administrator is aware of the amount of credit that will be extended toward the purchase of various tests. If the administrator wishes to order any of the listed tests, he simply clicks the "Order" button 84 associated with the test and an order page (not shown) appears, prompting the administrator to enter the quantity of tests desired. A "submit" button (not shown) is provided on the order page to allow the administrator to submit his order after completing all required fields on the order page. As mentioned previously, certain qualifications are required for the administrator to order certain tests. If the administrator's qualifications are not sufficient to allow him to order the test, the system will block any attempt by the administrator to order the test.

Figure 5:
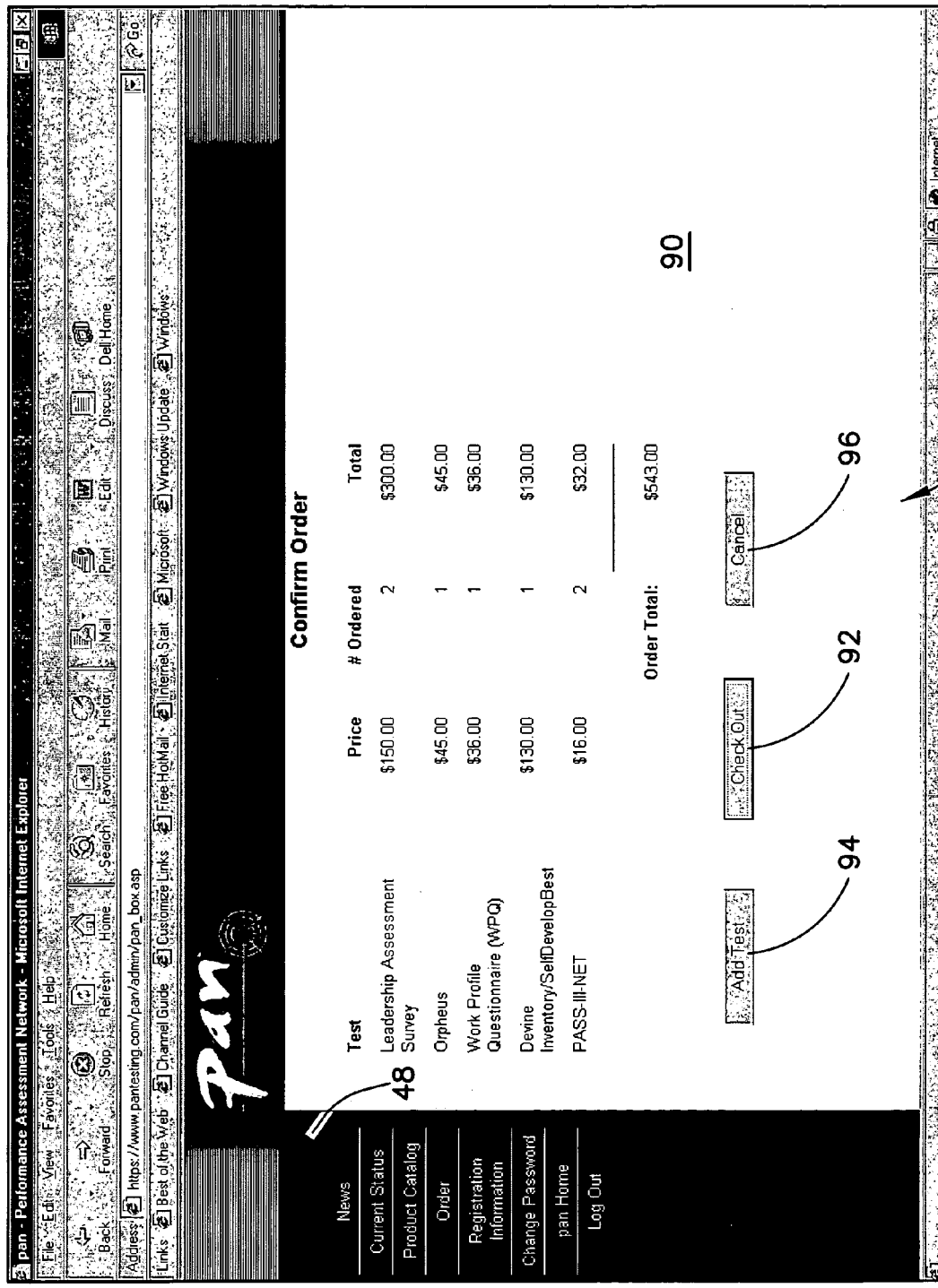
FIG. 5 shows a confirm order page for the test administration system using the Internet.

After submitting an order for a quantity of tests, a confirm order page 90 is presented to the administrator, showing the total price and quantity of each test ordered, along with the total price of the order. An exemplary confirm order page 90 is shown in FIG. 5. In the example order shown in FIG. 5, the administrator has ordered two Leadership Assessment Surveys for a total of $300.00, one Orpheus for a total of $45.00, one Work Profile Questionnaire for a total of $36.00, one Devine Inventory/SelfDevelopBest for $130.00, and two PASS-III-Nets for a total of $32.00. The total order price is $543.00. The administrator may submit the order and arrange payment for the tests by selecting the "Check Out" option 92 and entering credit information, electronic funds transfer information, or by requesting to be billed for the order. After the order is submitted, the quantity ordered for each test is added to the "Ordered" column 72 on the administrator's current test status page 70 (shown in FIG. 3). If the information shown on the confirm order page 90 is not correct, the administrator may add additional tests by selecting the "Add Test" option 94 or completely cancel the order by selecting the "Cancel" option 96.

Once the administrator has ordered a test, a test identification code or "Tester ID" must be generated for the test and assigned to the test subject before the test subject can take the test. To generate Tester IDs, the administrator returns to the test status page 70, as shown in FIG. 3, by choosing the current status option 54 from the menu 48. Once the test status page 70 is displayed, the administrator clicks the number in the Ordered column 72 for the test he wishes to assign, and a generate Tester ID page 100 is shown, such as the exemplary generate Tester ID page 100 shown in FIG. 9. The generate Tester ID page 100 displays the name of the selected test under the test name identifier 101 and the number of tests that have been ordered but have not been assigned under the quantity available identifier 102. The generate Tester ID page 100 also provides a space 104 used to enter a quantity of Tester IDs to be generated by the system. The administrator may only enter a number in the space 104 that is less than or equal to the number in the quantity available identifier 102. After the test administrator enters the number of Tester IDs to generate and selects the "submit" button 106, the system generates the appropriate number of random Tester IDs. The random Tester IDs generated are typically alpha-numeric identifiers. For example, a typical Tester ID may be T8407877.

Figure 10:
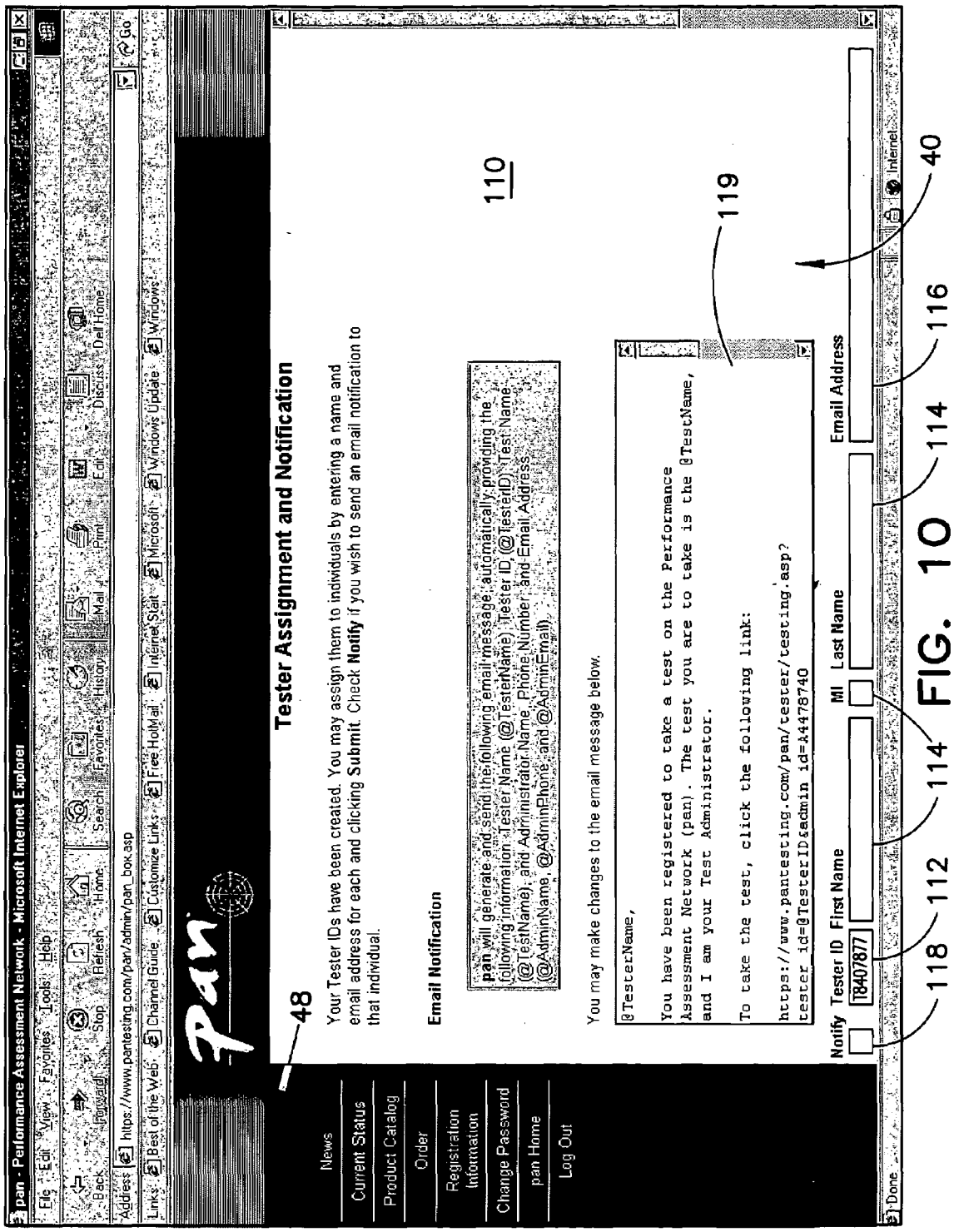
FIG. 10 shows a tester assignment page for the test administration system using the Internet.

After the new Tester IDs are generated, a tester assignment page 110 is show to the administrator. An exemplary tester assignment page 110 is shown in FIG. 10. The tester assignment page allows the administrator to match each new Tester ID with a particular test subject. In order to match a particular test subject with a Tester ID, the administrator goes to the Tester ID list, 112 on the tester assignment page and finds the Tester ID to be associated with a particular test subject. The administrator then enters the name of the test subject on a name line 114 of the tester assignment page next to the Tester ID. The administrator also enters the e-mail address of the test subject next to the Tester ID on an e-mail line 116. If multiple Tester IDs were generated by the system, the administrator enters identification information for other test subjects next to other Tester IDs in the tester ID list 112.

The tester assignment page 110 also includes a notify box 118 for each Tester ID generated by the system. If the administrator selects this notify box for a particular test subject associated with a Tester ID, the system will generate an e-mail message to the test subject to notify the test subject that he or she is registered to take a test using the system and provide the test subject with access information for use by the test subject to access the test he is to take. The form e-mail message generated by the system is shown in the message box 119. An exemplary form e-mail generated by the system for delivery to test subjects is as follows:

@TesterName,
You have been registered to take a test on the Performance Assessment Network (PAN). The test you are to take is the @TestName, and I am your Test Administrator.
To take the test, click on the following link: https://www.pantesting.com/pan/tester/testing.asp?TesterID=@TesterID&admin_id=T8407877
Or go to http://www.pantesting.com and click "Testing." Then enter the following information:
Tester ID: @TesterID
Administrator ID: T8407877
Follow the directions on the screen. If you have any questions, contact me.
@AdminName
@AdminPhone
@AdminEmail In the above exemplary message, a text string preceded by an "@" indicates that the text string is a field which the system automatically replaces with the relevant information for each test subject when an e-mail is sent.

Figure 11:
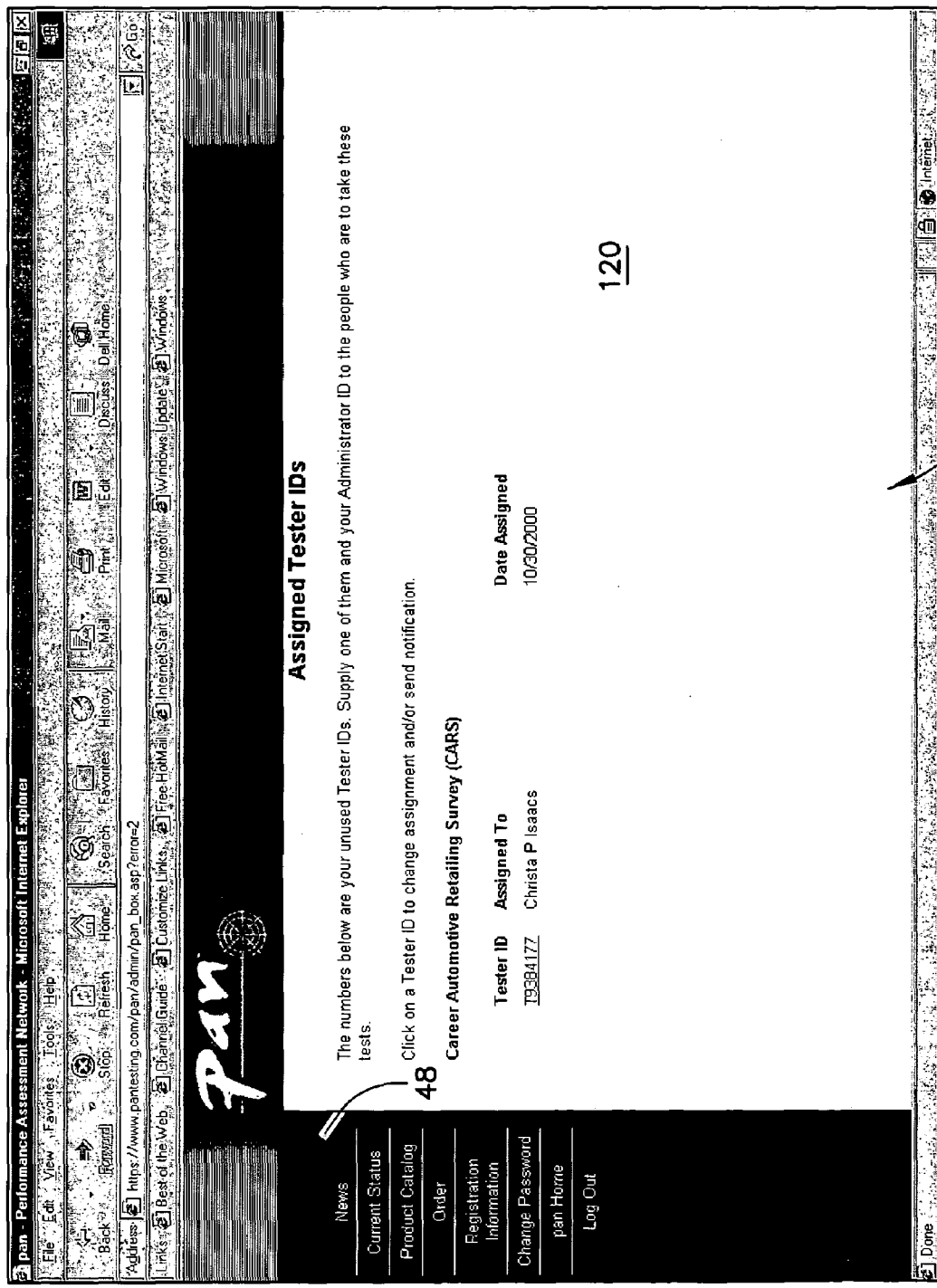
FIG. 11 shows an assigned Tester ID page for the test administration system using the Internet.

The administrator may view or change the test subject assigned to a particular Tester ID, or any relevant information related thereto, at any time as long as the test taker has not begun taking the test. If the administrator wishes to make such a change, the administrator returns to the test status page 70, shown in FIG. 3, and clicks the number in the Assigned column 74 next to the desired test. When the administrator does this, all Tester IDs of the selected type of test that have been generated and assigned to a test subject are displayed on an assigned Tester ID page 120, provided that the test subject has yet to take the test associated with the assigned Tester ID. An exemplary assigned Tester ID page 120 is shown in FIG. 11. Each Tester ID is displayed with the name of the test taker assigned to it and the date the assignment was made. If the administrator clicks on one of the Tester IDs, a Tester ID information page 130 is displayed, such as the Tester ID Information page shown in FIG. 12. The Tester ID Information page 130 allows the administrator to enter or change the name on the name line 134 and/or change the email address of the test taker on the e-mail line 136. In addition, the administrator may edit the email message text displayed in the message box 139. The system saves any changes made by the administrator and, if the administrator checks the notify box 138, sends an electronic mail message to the new test taker matched with a Tester ID to notify the new test taker him about his test.

The Tester ID information page 130 also provides the administrator with the option of allowing a test subject to take the test on the same computer currently being used by the test administrator. To accomplish this, the test administrator simply clicks on the small "note" icon 132 to the left of the Tester ID, and the system presents the test to be taken by the test subject on the test administrator interface 20. The test administrator then watches as the test subject takes the test on the test administrator interface.

Figure 6:
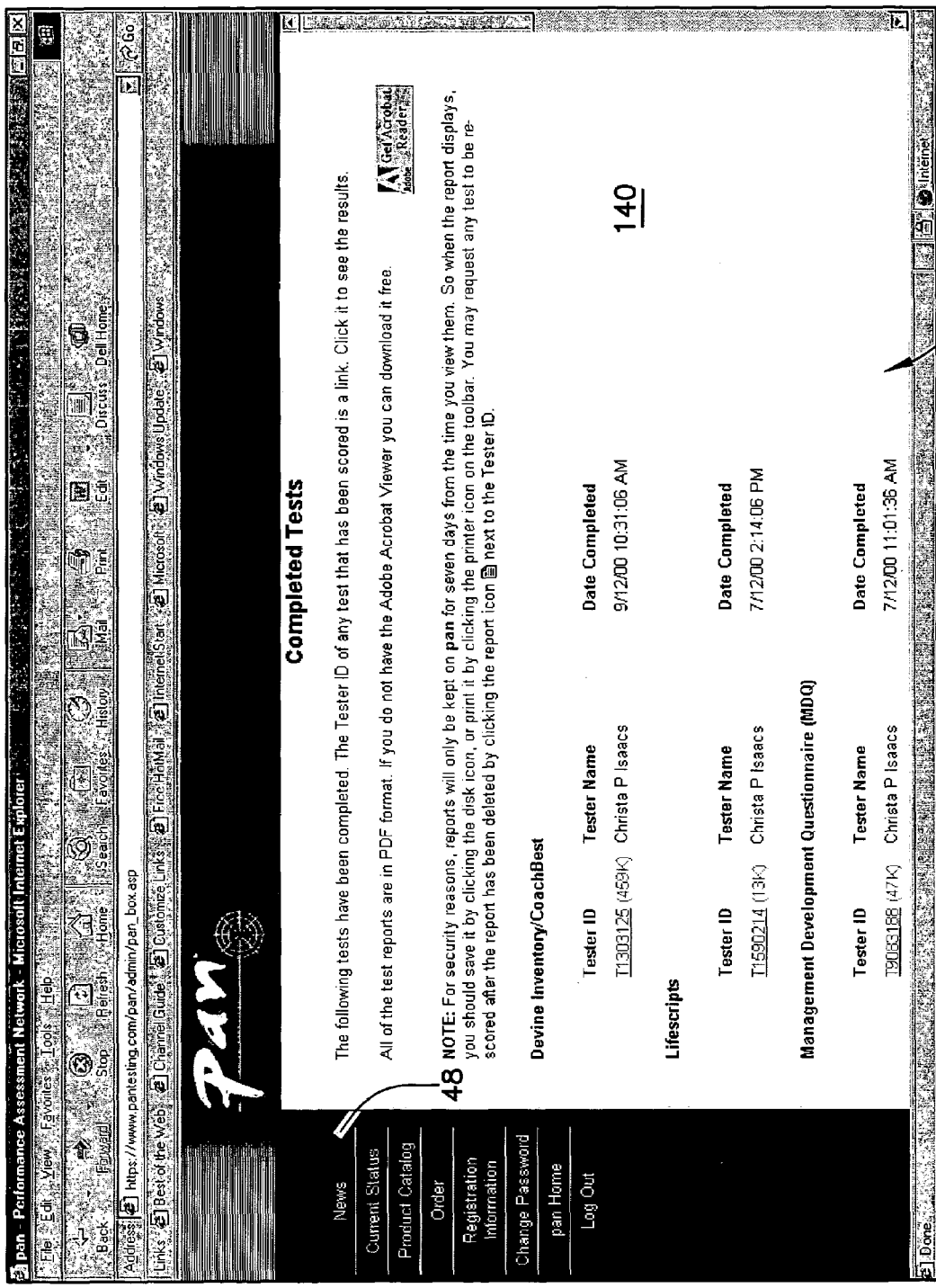
FIG. 6 shows a completed tests page for the test administration system using the Internet.
Figure 7:
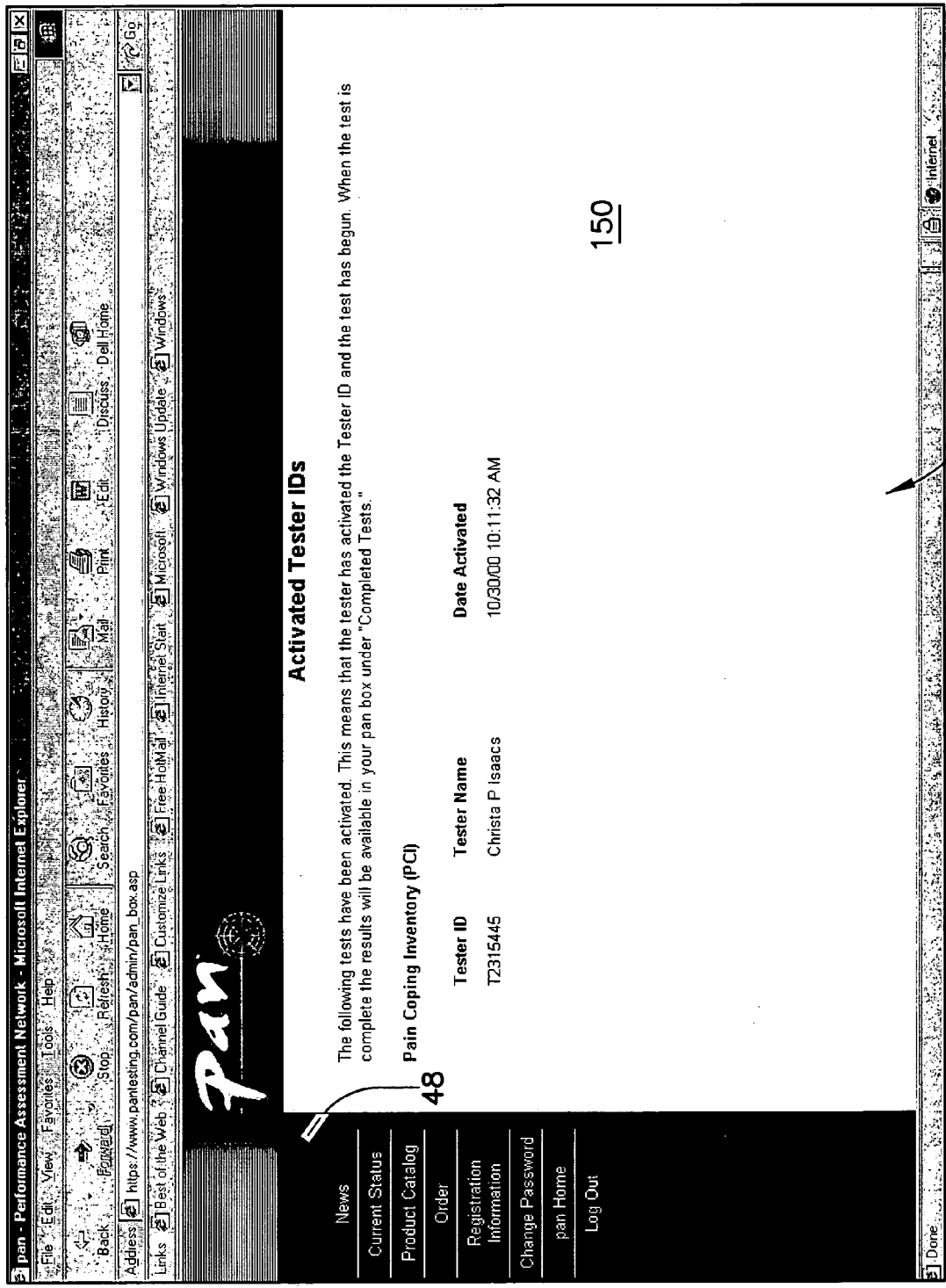
FIG. 7 shows a tests id progress page for the test administration system using the Internet.

By returning to the test status page 70 shown in FIG. 3, the administrator may check to see which of his subjects have completed their tests. To check on completed tests, the administrator selects the "completed" column 76, and a completed tests page 140 is displayed showing the tests that have been completed for particular types of tests. An exemplary completed test page 140 is shown in FIG. 6. The completed test page 140 includes a listing of the different types of tests completed along with a Tester ID for each completed test. For each Tester ID number, the completed test page includes the name of the test subject and the date and time that the subject completed the test. The test administrator may click on the Tester ID number, and a test report will be provided showing test results.

By returning again to the test status page 70 shown in FIG. 3, the test administrator may also check the status of activated tests by clicking the "Test in Progress" option 80. This option will pull up an activated tests page 150 that displays information on each test where the test subject has activated the tester ID and the test is currently in progress. An exemplary activated tests page 150 showing information on tests in progress is displayed in FIG. 7. This page lists each activated tester ID, the name of the test subject, and the date and time that the test was started.

Figure 8:
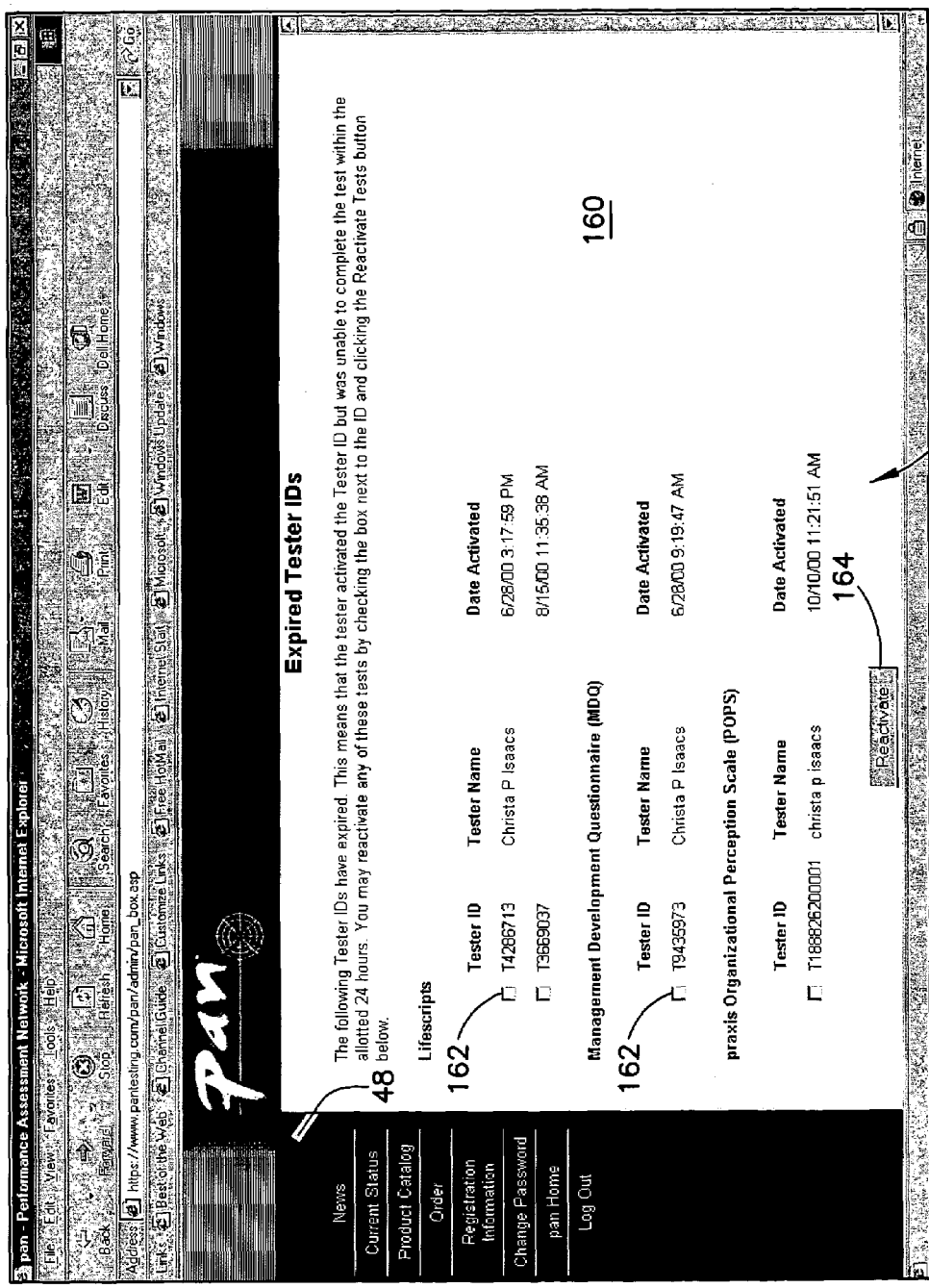
FIG. 8 shows a n expired tests page for the test administration system using the Internet.
Figure 9:
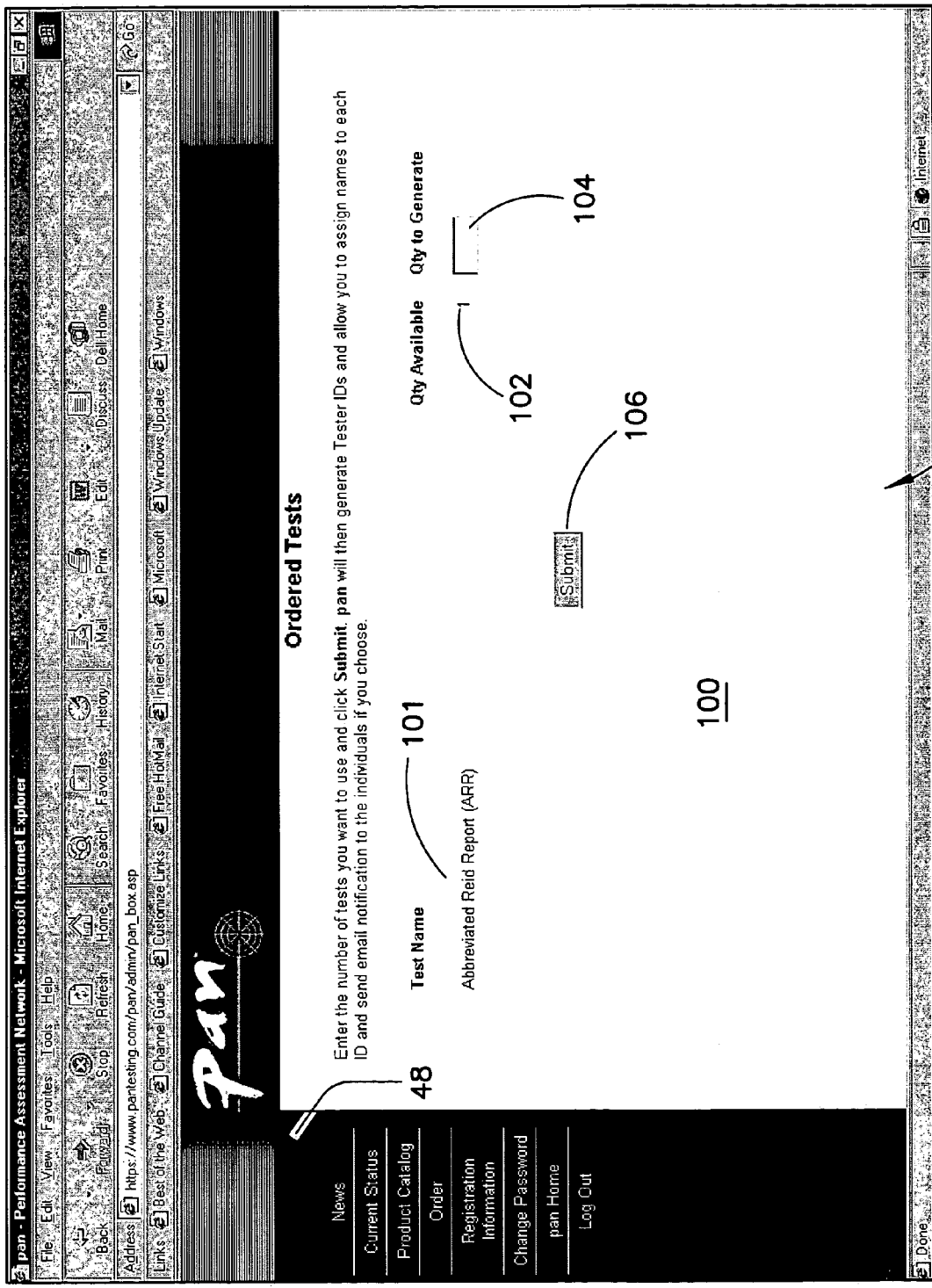
FIG. 9 shows a generate Tester ID page for the test administration system using the Internet.

By returning again to the test status page 70, the administrator may also view an expired tests page 160 containing information on expired tests. Expired tests are tests that were activated when the subject entered the Tester ID into the system and started the test, but did not complete the test within the allotted time period. An exemplary expired test page 160 is shown in FIG. 8 and lists information concerning each expired Tester ID, including the name of the individual who started the test and the date and time that the test was started. The administrator may reset the Tester IDs to "Active" status by clicking the box 162 next to the Tester ID and then clicking the "Reactivate" button 164. This allows the test taker to log in to the test again and complete it.

The system thus provides a novel system and method for administering tests and related assessments using the Internet. The above described embodiments of the invention are provided for illustration purposes, and the invention should not be limited to the embodiments shown and described, as it will be readily apparent to those of skill in the art that other embodiments of the invention are possible.

We claim:

1. A test administration system providing communications between a test administrator and at least one test taker, the test administration system linking a plurality of remote computers and comprising:
   a) at least one database containing a plurality of tests that may be distributed to the at least one test taker, the at least one database also containing qualification data for the test administrator, the qualification data for the test administrator being distinct from a username or password; and
   b) a central computer communicating with the at least one database, the central computer providing an administrator workspace accessible by the test administrator at one of the plurality of remote computers, the administrator workspace operable to
      i) provide the test administrator with the ability to order the plurality of tests contained in the at least one database, wherein the test administrator's ability to order the at least one of the plurality of tests is dependent upon the qualification data of the test administrator;
      ii) provide the test administrator with access information for delivery to the at least one test taker, the access information providing the at least one test taker with the ability to access one of the plurality of tests using one of the plurality of remote computers and take the one of the plurality of tests using one of the plurality of remote computers; and
      iii) provide the test administrator with information about the tests ordered by the test administrator.

2. The system of claim 1 wherein the one of the plurality of remote computers used by the at least one test taker is the same one of the plurality of computers providing the administrator workspace.

3. The system of claim 1 wherein the one of the plurality of remote computers used by the at least one test taker is a different one of the plurality of computers providing the administrator workspace.

4. The system of claim 1 wherein the information about the tests ordered by the test administrator includes information about the number of tests ordered by the test administrator.

5. The system of claim 1 wherein the information about the tests ordered by the test administrator includes information about the one of the plurality of tests accessed by the at least one test taker.

6. The system of claim 1 wherein the access information includes a test identification code.

7. The system of claim 6 wherein the administrator workspace is further operable to provide the test administrator with the ability to match the test identification code with the at least one test taker and automatically send a message to the at least one test taker after the at least one test taker is matched with the test identification code.

8. The system of claim 1 wherein the administrator workspace provides the administrator with a description of each of the plurality of tests contained in the at least one database.

9. The system of claim 1 wherein the central computer is operable to generate a test identification code for the one of the plurality of tests and allow the administrator to match the test identification code with the at least one test taker.

10. The system of claim 9 wherein the administrator workspace provides the administrator with an option to automatically send an electronic message to the at least one test taker once the test identification code is matched with the at least one test taker, the message providing the at least one test taker with the test identification code.

11. A test administration system providing communications between a test administrator and at least one test taker, the test administration system linking a plurality of remote computers and comprising:
   a) at least one database containing a plurality of tests that may be distributed to the at least one test taker; and
   b) a central computer communicating with the at least one database, the central computer providing an administrator workspace accessible by the test administrator at one of the plurality of remote computers, the administrator workspace operable to i) provide the test administrator with access to a product catalog showing the plurality of tests in the at least one database and a price associated with each of the plurality of tests;
ii) provide the test administrator with the ability to order at least one of the plurality of tests contained in the product catalog;
iii) provide the test administrator with access information for delivery to the at least one test taker, the access information providing the at least one test taker with the ability to access one of the plurality of tests using one of the plurality of remote computers and take the one of the plurality of tests using one of the plurality of remote computers; and
iv) provide the test administrator with information about the at least one of the plurality of tests ordered by the test administrator.

12. The system of claim 11 wherein the information about the at least one of the plurality of tests comprises the number of tests that have been completed by the at least one test taker using one of the plurality of remote computers.

13. The system of claim 11 wherein the information about the at least one of the plurality of tests comprises the number of tests ordered by the test administrator.

14. The system of claim 11 wherein the access information includes a test identification code.

15. The system of claim 14 wherein the administrator workspace further provides the test administrator with the ability to match the test identification code with the at least one test taker and automatically send a message to the at least one test taker after the at least one test taker is matched with the test identification code.

16. A method of providing a test administrator with the ability to administer tests to at least one test taker using computers connected over a network, the method comprising the steps of:
a) providing at least one database containing a plurality of tests for distribution to the at least one test taker, the at least one database further containing qualifications for the test administrator, the qualifications for the test administrator being distinct from a username or password;
b) providing a central computer in communication with the at least one database, the central computer also in communication with one of a plurality of remote computers over the network;
c) providing the test administrator with the ability to order at least one of the plurality of tests contained in the at least one database using one of the plurality of remote computers, wherein the test administrator's ability to order at least one of the plurality of tests is dependent upon the qualifications of the test administrator contained in the at least one database;
d) distributing the at least one of the plurality of tests ordered by the test administrator to the at least one test taker at one of the plurality of remote computers;
e) recording test answers provided by the at least one test taker; and
f) providing the test administrator with information about the at least one of the plurality of tests ordered by the test administrator at one of the plurality of remote computers.

17. The method of claim 16 wherein the information about the at least one of the plurality of tests ordered by the test administrator includes information about the number of tests ordered by the test administrator.

18. The method of claim 16 wherein the information about the at least one of the plurality of tests ordered by the test administrator includes information about the number of tests that have been completed by the at least one test taker.

19. The method of claim 16 further comprising the step of providing a test scoring machine operable to obtain the test answers provided by the at least one test taker and provide a test report accessible by the test administrator at one of the plurality of remote computers.

20. The method of claim 16 wherein the qualifications for the test administrator provide a clearance for the test administrator to order certain license controlled tests.

* * * * *